(12) United States Patent
Richter et al.

(10) Patent No.: US 9,031,771 B2
(45) Date of Patent: May 12, 2015

(54) METHOD AND SYSTEM FOR DETERMINING A POSITION AND/OR ORIENTATION OF A DISPLACEABLE LOAD

(75) Inventors: Lutz Richter, Mixdorf (DE); Andreas Peiker, Friedrichsdorf (DE); Peter Kitzenmaier, Potsdam (DE); Cüneyt Göktekin, Potsdam (DE); Oliver Tenchio, Potsdam (DE)

(73) Assignees: Peiker Acustic GmbH & Co., Friedrichsdorf (DE); Beyo GmbH, Potsdam (DE)

( * ) Notice: Subject to any disclaimer, the term of this patent is extended or adjusted under 35 U.S.C. 154(b) by 1008 days.

(21) Appl. No.: 13/094,151

(22) Filed: Apr. 26, 2011

(65) Prior Publication Data

US 2011/0257929 A1    Oct. 20, 2011

Related U.S. Application Data

(63) Continuation of application No. PCT/DE2009/001558, filed on Nov. 9, 2009.

(30) Foreign Application Priority Data

Nov. 12, 2008  (DE) .......................... 10 2008 057 027

(51) Int. Cl.
  *B64F 1/10*     (2006.01)
  *B64F 1/22*     (2006.01)
  *B63B 43/18*    (2006.01)
  *B63B 49/00*    (2006.01)

(52) U.S. Cl.
  CPC ... *B64F 1/22* (2013.01); *B64F 1/10* (2013.01); *B63B 43/18* (2013.01); *B63B 49/00* (2013.01); *B64F 1/227* (2013.01)

(58) Field of Classification Search
  CPC ........................................................ B64F 1/10
  See application file for complete search history.

(56) References Cited

U.S. PATENT DOCUMENTS

| 5,364,117 | A | 11/1994 | Keith |
| 6,305,484 | B1 | 10/2001 | Leblanc |
| 2004/0225440 | A1 | 11/2004 | Khatwa et al. |
| 2008/0083851 | A1* | 4/2008 | Perry et al. .................... 244/189 |
| 2012/0326894 | A1* | 12/2012 | Schmidt et al. ............... 340/960 |

FOREIGN PATENT DOCUMENTS

FR    2 675 919 A1    10/1992

* cited by examiner

*Primary Examiner* — John Q Nguyen
*Assistant Examiner* — Michael Kerrigan
(74) *Attorney, Agent, or Firm* — Burr & Brown, PLLC

(57) ABSTRACT

The present invention relates to a method for determining at least one of a position and an orientation of a movable load. The present invention also relates to a position and orientation determining system for a group which includes a towing vehicle and at least one load which can be moved by the towing vehicle.

14 Claims, 2 Drawing Sheets

METHOD AND SYSTEM FOR DETERMINING A POSITION AND/OR ORIENTATION OF A DISPLACEABLE LOAD

CROSS REFERENCE TO RELATED APPLICATIONS

This application is a continuation of International Application No. PCT/DE2009/001558 filed Nov. 9, 2009, which designated the United States, and claims the benefit under 35 USC §119(a)-(d) of German Application No. 10 2008 057 027.3 filed Nov. 12, 2008, the entireties of which are incorporated herein by reference.

FIELD OF THE INVENTION

The invention relates to a method for determining a position and/or orientation of a movable load, and a position and orientation determining system.

BACKGROUND OF THE INVENTION

Aircraft that are becoming ever larger have to be maneuvered on airfields by towing vehicles. During the process, the towing vehicle generally holds the nose wheel of the aircraft which forms a load, in order to maneuver the aircraft between parked aircraft or into a hangar, for example. During maneuvering, the driver of the towing vehicle is generally assisted by so-called "wing watchers" which are people who, in particular, observe the tips of the wings and the tail and use radios to warn the driver about collisions with other aircraft, vehicles, lights or the hangar, for example. The labor cost for such maneuvering processes is high and, furthermore, the movements of the aircraft can often be assessed by the person involved only with difficulty since, because of the kinematics between the towing vehicle and the aircraft, slight movements of the towing vehicle can often result in major and rapid movements of the aircraft. The aircraft systems generally cannot be used to assist the maneuvering processes, because the aircraft is in general completely shut down and inaccessible during the maneuvering process.

SUMMARY OF THE INVENTION

The present invention is based on the object of developing a method and a system by means of which there is a higher probability that collisions can be avoided.

The method according to the invention for determining a position and/or orientation of a movable load, in which the load is connected to a towing vehicle, provides for a position and an orientation of the towing vehicle to be determined and, furthermore, for a relative position of the load, which the load assumes with respect to the towing vehicle, to be detected by means of a sensor system, and for at least one of the position and the orientation of the load to be determined from the position of the towing vehicle and the relative position of the load. This method for calculating the position of the load, which is based exclusively on data determined from the towing vehicle, makes it possible to make the position of the load available without any need for manipulation on the load. The essence of the present invention is therefore remote determination of the position of the load, by a combination of data from different systems, determined from the towing vehicle. If the load is in the form of an aircraft, it is assumed, in particular, that the aircraft is in a predetermined orientation at a defined parking position, and that this parking position is known for the determination process according to the method.

The invention furthermore provides for the orientation (II) of the towing vehicle (1) additionally to be used for determining at least one of the position (III) and the orientation (IV) of the load (2). Even when picking up the load from an undefined parking position, in which the orientation of the load is unknown, this makes it possible to correctly display the group directly after the connection of the towing vehicle and the load.

In order to determine the orientation of the towing vehicle, the invention provides for the use of one of two position-determining devices which are arranged in defined positions with respect to one another in the towing vehicle, one position-determining device and a compass associated with the towing vehicle, and one position-determining device and data relating to a previous position of the towing vehicle. This allows the orientation of the towing vehicle to be determined without the towing vehicle having previously been moved. This is particularly advantageous when the towing vehicle has been parked for a relatively long time with a load attached since, in this case, the orientation of the towing vehicle and the load can be determined even before the initial movement.

Furthermore, the method according to the present invention provides that the load is displayed with the load contour in the form of a graphic on a two-dimensional chart, or a volume model is displayed in the form of a graphic in three-dimensional space, on the basis of the determined position and orientation of the load, depending on one of the load contour determined by a vertical projection of the load, which shows the outline of the load, and the volume model of the load, with collision points between the load and the obstructions detected using one of the chart data and the three-dimensional data, which obstructions occur during specific driving movements of the towing vehicle, being calculated, in particular, on the basis of one of chart data and three-dimensional data. This makes it possible to move the load past obstructions, which have been recorded on one of the two-dimensional chart and in the three-dimensional data, without any collision.

The present invention furthermore provides for the towing vehicle to be displayed in the form of a graphic on one of a two-dimensional chart and in three-dimensional space on the basis of the position and orientation determined for the towing vehicle, with one of its towing vehicle contour and its volume model. The orientation of the towing vehicle and the load is therefore indicated to the driver, thus reducing the probability of him initiating undesirable driving maneuvers.

The present invention also provides for one of the two-dimensional chart and the three-dimensional space to be displayed on a display means, in particular, on a monitor with the obstructions and, in particular, driving movements also being displayed on the monitor. This allows the driver to plan the maneuvering movement in advance, even in poor visual conditions. Furthermore, the system allows the driver to also follow virtual driving movements.

In addition, the present invention provides for the obstructions to be displayed with their contours and volume models one of two-dimensionally and three-dimensionally on the display means, with the contours and volume models being taken, in particular, from an obstruction database or being fed into it again, as required, depending on the current situation. When a superordinate coordinate system is available, it is possible, for example, to at least one of preset driving movements and overlay the obstructions on the display means, depending on the changing overall situation.

The present invention also provides for a movement, in particular, a pivoting movement of the load, to be calculated in advance on the basis of the relative position of the load, a movement direction of the towing vehicle, and a speed of the towing vehicle. This makes it possible to warn the driver of the towing vehicle of possible collisions in good time, or even to initiate emergency braking of the towing vehicle if the driver does not initiate any scaling or braking reaction which would avoid the collision that has been calculated in advance.

Furthermore, the present invention provides for a stress on the load resulting from the movement of the load, in particular a stress on an undercarriage of the load, to be calculated in advance on the basis of the data mentioned above. This makes it possible to warn the driver against maneuvers which would cause an excessive stress on the load, for example, as a result of the towing vehicle and load being in a 90° position. In particular, provision is also made for a corresponding movement of the towing vehicle to be blocked automatically in the event of maneuvers that are identified as critical.

The position and orientation determining system according to the present invention for a group, which comprises a towing vehicle and at least one load which can be moved by the towing vehicle, provides a sensor system as a component of the position and orientation determining system, by means of which a relative position of the load, which the load assumes with respect to the towing vehicle, can be determined from the towing vehicle and, as a further component of the position and orientation determining system, provides a computation unit, by means of which a position and, in particular, an orientation of the load can be determined. A system such as this, which allows at least one of the position and the orientation of the load to be calculated based exclusively on data which can be determined from the towing vehicle, makes it possible to make at least one of the position and the orientation of the load available to the system without any need for substantial manipulation on the load. The essence of the present invention is therefore a system for remotely determining at least one of the position and the orientation of the load by means of apparatuses for detecting and combining data from different systems.

The present invention furthermore provides for the sensor system to be arranged on the towing vehicle. This results in the position and orientation determining system being independent of the load, allowing it to be used for a multiplicity of loads.

The present invention also provides for the sensor system to be equipped with an optical sensor which, in particular, is in the form of a camera system, with the camera system being directed at the load. A sensor system such as this can be used for widely differing loads by appropriate programming of an image recognition system associated with the sensor system. In particular, a system such as this also allows for automatic detection of the load type. A sensor system such as this also allows for detection and identification of different aircraft types which have to be towed as loads by the towing vehicle.

Finally, in particular, when the movable load is in the form of an aircraft, the present invention provides for the towing vehicle and the aircraft to be connected, in particular, in the area of the nose wheel such that rotation is possible about a vertical rotation axis. This results in kinematics between the towing vehicle and the load which can be calculated easily, allowing rapid calculation of possible collision points, even when little computation power is available.

For the purposes of the present invention, a position of a towing vehicle means a position of the towing vehicle which can be described by coordinates in one of a two-dimensional and a three-dimensional reference system. By way of example, the position is described by geographic coordinates, which are detected by means of a position-determining device, in particular, a satellite navigation device such as GPS.

For the purposes of the present invention, a position of a load means a position of the load which can be described by coordinates which the load assumes in an absolute form in one of a two-dimensional and a three-dimensional reference system, or a position the load assumes in one of a two-dimensional and a three-dimensional reference system relative to a position of the towing vehicle. By way of example, an absolute position is described by geographic coordinates.

For the purposes of the present invention, one of an orientation of the towing vehicle and an orientation of the load means an alignment of the towing vehicle and the load which can be displayed by means of one of a direction arrow, a contour and a volume model in one of a two-dimensional and a three-dimensional reference system.

For the purposes of the present invention, a position-finding system means a system which includes at least one of a position-determining device and an orientation-determining device.

BRIEF DESCRIPTION OF THE DRAWINGS

Further details of the invention are described in the drawing with reference to one schematically illustrated exemplary embodiment.

DETAILED DESCRIPTION OF THE DRAWINGS

Figure 1:
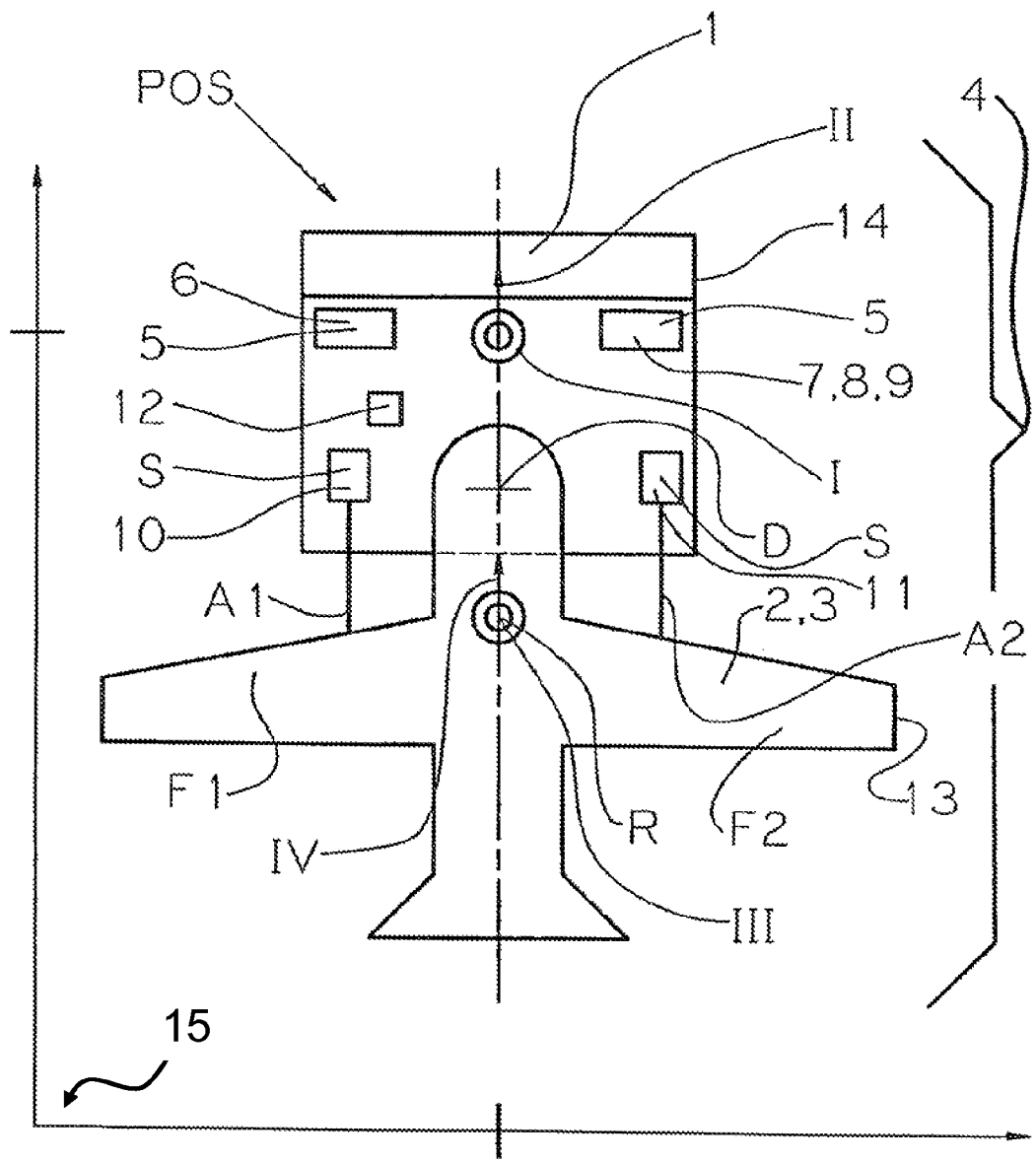
FIGS. 1 and 2 show a plan view of a towing vehicle and a load in two different positions and orientations, illustrated schematically.

FIG. 1 shows a plan view of a towing vehicle 1 and a load 2. The load 2 is in the form of an aircraft 3. The towing vehicle 1 and the load 2 together form a group 4. A position-finding system 5 is arranged in the towing vehicle 1, comprising a position-determining device 6, which is used to determine a position I of the towing vehicle 1. In order to allow an orientation II of the towing vehicle I to be determined again even when the towing vehicle 1 is stationary, the towing vehicle 1 has a second position-determining device 7, which is arranged in a known position with respect to the first position-determining device 6 in the towing vehicle 1. According to a first embodiment of the present invention, a compass 8 is provided instead of the second position-determining device 7, allowing the orientation II of the towing vehicle 1 to be determined. According to a second embodiment of the present invention, data relating to a previous position of the towing vehicle 1 is available, in a memory 9, instead of using a second position-determining device 7 and instead of using a compass 8, from which data the orientation II of the towing vehicle 1 can be determined.

The towing vehicle 1 is connected to the load 2 such that it can rotate about a vertical rotation axis D. In order to determine a relative position R which the load 2 assumes with respect to the towing vehicle 1 with reference to the position I of the towing vehicle 1, the towing vehicle 1 has a sensor system S by means of which the relative position R can be determined. In the exemplary embodiment, the sensor system S comprises two rangefinders 10 and 11, which detect distances A1 and A2 between the wings F1 and F2 of the load 2, which is in the form of an aircraft 3, and the rangefinders 10, 11. A position and orientation system (POS) can now calculate a position III and an orientation IV of the load 2 on the basis of the position I of the towing vehicle 1, the orientation II of the towing vehicle 1 and the relative position R of the load 2 with respect to the towing vehicle. The position and orientation system (POS) includes the sensors 10, 11 and the position-finding system 5, by means of which the position I and the orientation II of the towing vehicle 1 can be determined. Furthermore, the position and orientation system (POS) includes a computation unit 12, in which the relative position R and, in particular, the position III and the orientation IV of the load 2 can be calculated. In this case, the computation unit 12 has information relating to at least one of the dimensions of the load 2 and the dimensions of the towing vehicle 1, as well as information relating to the kinematics between the towing vehicle 1 and the load 2. FIG. 1 shows a vertical projection of the load 2 as a load contour 13. A vertical projection of the towing vehicle 1 is likewise illustrated as a towing vehicle contour 14. These contours 13, 14 are displayed on a true scale on a two-dimensional chart, indicated by an xy coordinate system 15.

Figure 2:
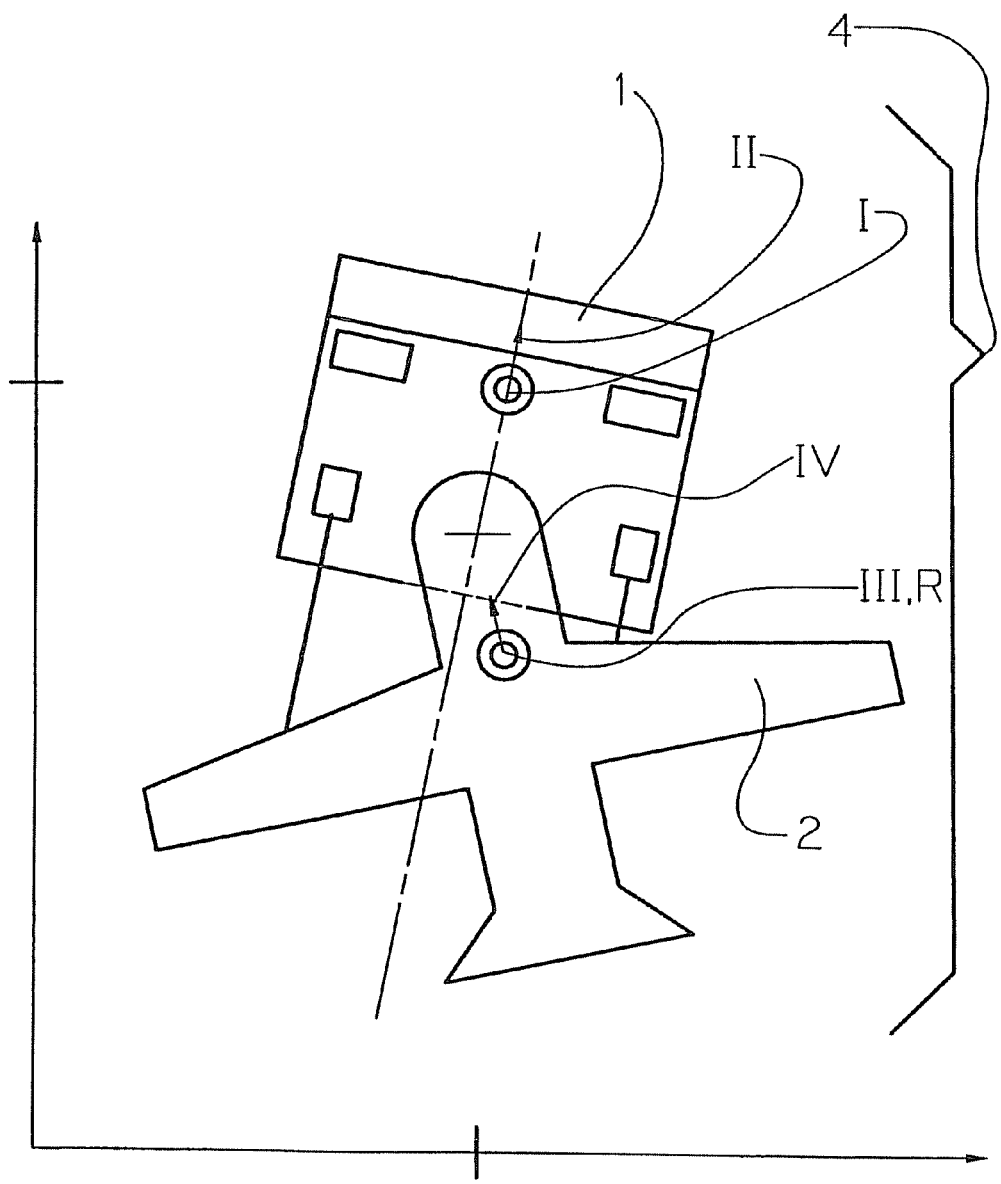

FIG. 2 once again shows the group 4 as known from FIG. 1, with the towing vehicle 1 and the load 2 assuming different positions I and III and orientations II and IV, and with the load 2 assuming a different relative position R with respect to the towing vehicle 1.

The invention is not restricted to the illustrated or described exemplary embodiments. In fact, it covers developments of the present invention within the scope of the patent claims.

In particular, the present invention provides for the towing vehicle and the load to be in the form of a watercraft and, in particular, in the form of a tug and a barge. The present invention also provides for a multi-element group to be formed from a towing vehicle and at least two loads, in which the relative position of each load of the multi-element group can be detected.

Furthermore, the present invention provides for the display means on which the situation is displayed, in particular, for the driver of the towing vehicle to generate an assistant in one of a two-dimensional and a three-dimensional form by means of which a view of the load or the aircraft can be selectively overlaid, in particular, from a bird's eye perspective with at least one of the mapping of the coordinates of the aircraft and towing vehicle and driving movements and obstructions.

LIST OF REFERENCE SYMBOLS

1 Towing vehicle
2 Load
3 Aircraft
D Vertical rotation axis between the towing vehicle and the load
4 Group
5 Position-finding system
6 Position-determining device
7 Second position-determining device
8 Compass
9 Memory
10 Rangefinder
11 Rangefinder
12 Computation unit for determining the position and orientation of the load
13 Load contour
14 Towing vehicle contour
15 X, Y coordinates system for a Two-dimensional chart
I Position of the towing vehicle
II Orientation of the towing vehicle
III Position of the load
IV Orientation of the load
R relative position of the load with respect to the towing vehicle
A1 Distance between 10 and F1
A2 Distance between 11 and F2
F1 Port wing of 3
F2 Starboard wing of 3
POS Position and orientation determining system
S Sensor system

The invention claimed is:

1. A method for determining at least one of a position and orientation of a movable load, comprising: determining a position and an orientation of the towing vehicle, detecting a relative position of the load, which the load assumes with respect to the towing vehicle, by means of a sensor system, and determining at least one of the position and the orientation of the load from the position of the towing vehicle and the detected relative position of the load from the sensor system, wherein the load is in the form of an aircraft that is connected to a towing vehicle in an area of a nose wheel of the aircraft such that the aircraft rotates about a vertical axis, wherein the at least one of the position and the orientation of the load is determined remotely by the sensor system which is installed only on the towing vehicle, and wherein the sensor system includes a computation unit having at least information relating to dimensions of the load.

2. The method as claimed in claim 1, wherein determining at least one of the position and the orientation of the load further comprises using the orientation of the towing vehicle.

3. The method as claimed in claim 1, wherein determining the position and the orientation of the towing vehicle is by means of a position-finding system using one of
    two position-determining devices at a distance from one another,
    one position-determining device and a compass, and
    one position-determining device and data relating to a previous position of the towing vehicle
    to determine the orientation of the towing vehicle.

4. The method as claimed in claim 1, further comprising displaying on the basis of the at least one of the determined position and orientation of the load as at least one of a load contour in the form of a graphic on a two-dimensional chart depending on the load contour determined by a vertical projection of the load, and a volume model in the form of a graphic in three-dimensional space depending on the volume model of the load, calculating collision points between the load and obstructions during specific driving movements of the towing vehicle on the basis of one of the two-dimensional chart data and the three-dimensional space data, and detecting the obstructions using the one of the two-dimensional chart data and the three-dimensional space data.

5. The method as claimed in claim 4, wherein the one of the two-dimensional chart and the three-dimensional space is displayed on a display means, in particular on a monitor, displaying the obstructions and driving movements on the monitor, wherein, in particular, the obstructions are also displayed as one of obstruction contours on the two-dimensional chart and obstruction volume models on the three-dimensional space on the display means, wherein the obstruction contours and the obstruction volume models, respectively, are at least one of taken from an obstruction database, and fed into the obstruction database again, depending on the current situation.

6. The method as claimed in claim 1, further comprising displaying on the basis of the determined position and orientation of the towing vehicle, one of the towing vehicle contour in the form of a graphic on a two-dimensional chart depending on the towing vehicle contour determined by a vertical projection of the towing vehicle, and a volume model of the towing vehicle in the form of a graphic in a three-dimensional space depending on the volume model of the towing vehicle.

7. The method as claimed in claim 1, further comprising calculating in advance a movement, and in particular a pivoting movement of the load, which the load assumes with respect to the towing vehicle, on the basis of the relative position of the load, and a movement direction and a speed of the towing vehicle.

8. The method as claimed in claim 1, further comprising calculating in advance a stress on the load resulting from the movement of the load on the basis of the relative position of the load with respect to the towing vehicle, and a movement direction and a speed of the towing vehicle, and on the basis of one of an automatic identification of a load type and an input of the load type, displaying by means of a load contour for the load type and geometric dimensions of various types of loads, which are used for calculating collision points resulting from movements of the load in particular at extremities of the load.

9. The method as claimed in claim 8, wherein the stress on the load is a stress on an undercarriage of the load.

10. The method as claimed in claim 1, wherein the load contours and volume models for each of the loads is at least one of stored in a database and called up from a database.

11. The method as claimed in claim 10, further comprising calculating collision warnings using at least one of the database for types of loads and an obstruction database.

12. The method as claimed in claim 1, further comprising calling up an obstruction database, wherein parked loads and other obstructions are stored with at least one of their respective contours and their volume models, and with at least one of their position and orientation in an obstruction database.

13. A position and orientation determining system for a group, which comprises a towing vehicle and at least one load which can be moved by the towing vehicle, with the position and orientation determining system comprising a position-finding system, by means of which a position and an orientation of the towing vehicle is determined, wherein the position and orientation determining system comprises a sensor system by means of which a relative position of the load, which the load assumes with respect to the towing vehicle, is determined from the towing vehicle, and in that the position and orientation determining system comprises a computation unit, by means of which a position of the load, and in particular an orientation of the load, is determined, wherein the sensor system is arranged on the towing vehicle only and at least one of the position and the orientation of the load are determined remotely by the sensor system, wherein the load is in the form of an aircraft, and the towing vehicle is connected to the aircraft in the area of a nose wheel, such that the aircraft rotates about a vertical rotation axis, and wherein the computation unit has information relating to dimensions of the load.

14. The position and orientation determining system as claimed in claim 13, wherein the sensor system comprises, in particular, an optical sensor which, in particular, is in the form of a camera system which is directed at the load.

* * * * *